(12) United States Patent
Gupta et al.

(10) Patent No.: US 11,463,377 B2
(45) Date of Patent: *Oct. 4, 2022

(54) USING EDGE-OPTIMIZED COMPUTE INSTANCES TO EXECUTE USER WORKLOADS AT PROVIDER SUBSTRATE EXTENSIONS

(71) Applicant: Amazon Technologies, Inc., Seattle, WA (US)

(72) Inventors: Diwakar Gupta, Seattle, WA (US); Georgios Elissaios, Seattle, WA (US); Ishwardutt Parulkar, San Francisco, CA (US); Upendra Bhalchandra Shevade, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,799

(22) Filed: Jan. 29, 2021

(65) Prior Publication Data

US 2021/0168092 A1 Jun. 3, 2021

Related U.S. Application Data

(63) Continuation of application No. 16/699,300, filed on Nov. 29, 2019, now Pat. No. 10,924,429.

(51) Int. Cl.
*G06F 15/16* (2006.01)
*H04L 47/70* (2022.01)
(Continued)

(52) U.S. Cl.
CPC .......... *H04L 47/821* (2013.01); *H04L 47/748* (2013.01); *H04L 47/783* (2013.01); *H04L 47/788* (2013.01); *H04L 47/828* (2013.01)

(58) Field of Classification Search
CPC ... H04L 47/821; H04L 47/748; H04L 47/783; H04L 47/788; H04L 47/828
(Continued)

(56) References Cited

U.S. PATENT DOCUMENTS 9,225,661 B1 12/2015 Yang et al.
9,229,750 B1 1/2016 Mehat et al.
(Continued)

OTHER PUBLICATIONS

AT&T, "AT&T's Network and Microsoft's Cloud Deliver New Customer Offerings", available online at <https://about.att.com/story/2019/microsoft.html>, Jul. 17, 2019, 3 pages.
(Continued)

*Primary Examiner* — Moustafa M Meky
(74) *Attorney, Agent, or Firm* — Nicholson De Vos Webster & Elliott LLP

(57) ABSTRACT

Techniques are described for enabling users of a service provider network to create and configure "application profiles" that include parameters related to execution of user workloads at provider substrate extensions. Once an application profile is created, users can request the deployment of user workloads to provider substrate extensions by requesting instance launches based on a defined application profile. The service provider network can then automate the launch and placement of the user's workload at one or more provider substrate extensions using edge-optimized compute instances (e.g., compute instances tailored for execution within provider substrate extension environments). In some embodiments, once such edge-optimized instances are deployed, the service provider network can manage the auto-resizing of the instances in terms of various types of computing resources devoted to the instances, manage the lifecycle of instances to ensure maximum capacity availability at provider substrate extension locations, and perform other instance management processes.

20 Claims, 11 Drawing Sheets

(51) Int. Cl.
*H04L 47/74* (2022.01)
*H04L 47/78* (2022.01)
*H04L 47/783* (2022.01)

(58) Field of Classification Search
USPC .......................................................... 709/226
See application file for complete search history.

(56) References Cited

U.S. PATENT DOCUMENTS

| | | | |
|---|---|---|---|
| 9,619,272 | B1 | 4/2017 | Mehat et al. |
| 9,898,307 | B2* | 2/2018 | Thiyagarajah ........ G06F 9/4406 |
| 9,936,019 | B2 | 4/2018 | Sanderson |
| 10,243,819 | B1 | 3/2019 | Chheda et al. |
| 10,645,160 | B2 | 5/2020 | Sanderson |
| 10,924,429 | B1* | 2/2021 | Gupta ................... H04L 47/828 |
| 2006/0294519 | A1* | 12/2006 | Hattori ............... G06F 9/45558 718/1 |
| 2011/0302578 | A1 | 12/2011 | Isci et al. |
| 2014/0058871 | A1 | 2/2014 | Marr et al. |
| 2014/0223013 | A1* | 8/2014 | Gaglianello ........ H04L 61/2084 709/226 |
| 2017/0031706 | A1 | 2/2017 | Podvratnik et al. |
| 2017/0177377 | A1* | 6/2017 | Thiyagarajah ........ G06F 9/4403 |
| 2019/0340032 | A1 | 11/2019 | Ganteaume |
| 2020/0073993 | A1 | 3/2020 | Mutreja et al. |
| 2020/0145488 | A1 | 5/2020 | Sanderson |

OTHER PUBLICATIONS

Microsoft, "AT&T Integrating 5G with Microsoft Cloud to Enable Next-Generation Solutions on the Edge", available online at <https://news.microsoft.com/2019/11/26/att-integrating-5g-with-microsoft-cloud-to-enable-next-generation-solutions-on-the-edge/>, Microsoft News Center, Nov. 26, 2019, 6 pages.

Notice of Allowance, U.S. Appl. No. 16/699,300, dated Oct. 7, 2020, 8 pages.

International Search Report and Written Opinion, PCT App. No. PCT/US2020/060481, dated Mar. 3, 2021, 12 pages.

* cited by examiner

USING EDGE-OPTIMIZED COMPUTE INSTANCES TO EXECUTE USER WORKLOADS AT PROVIDER SUBSTRATE EXTENSIONS

CROSS-REFERENCE TO RELATED APPLICATIONS

This application is a continuation of U.S. application Ser. No. 16/699,300, filed Nov. 29, 2019, which is hereby incorporated by reference.

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud" and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the drawings, in which.

DETAILED DESCRIPTION

Figure 1:
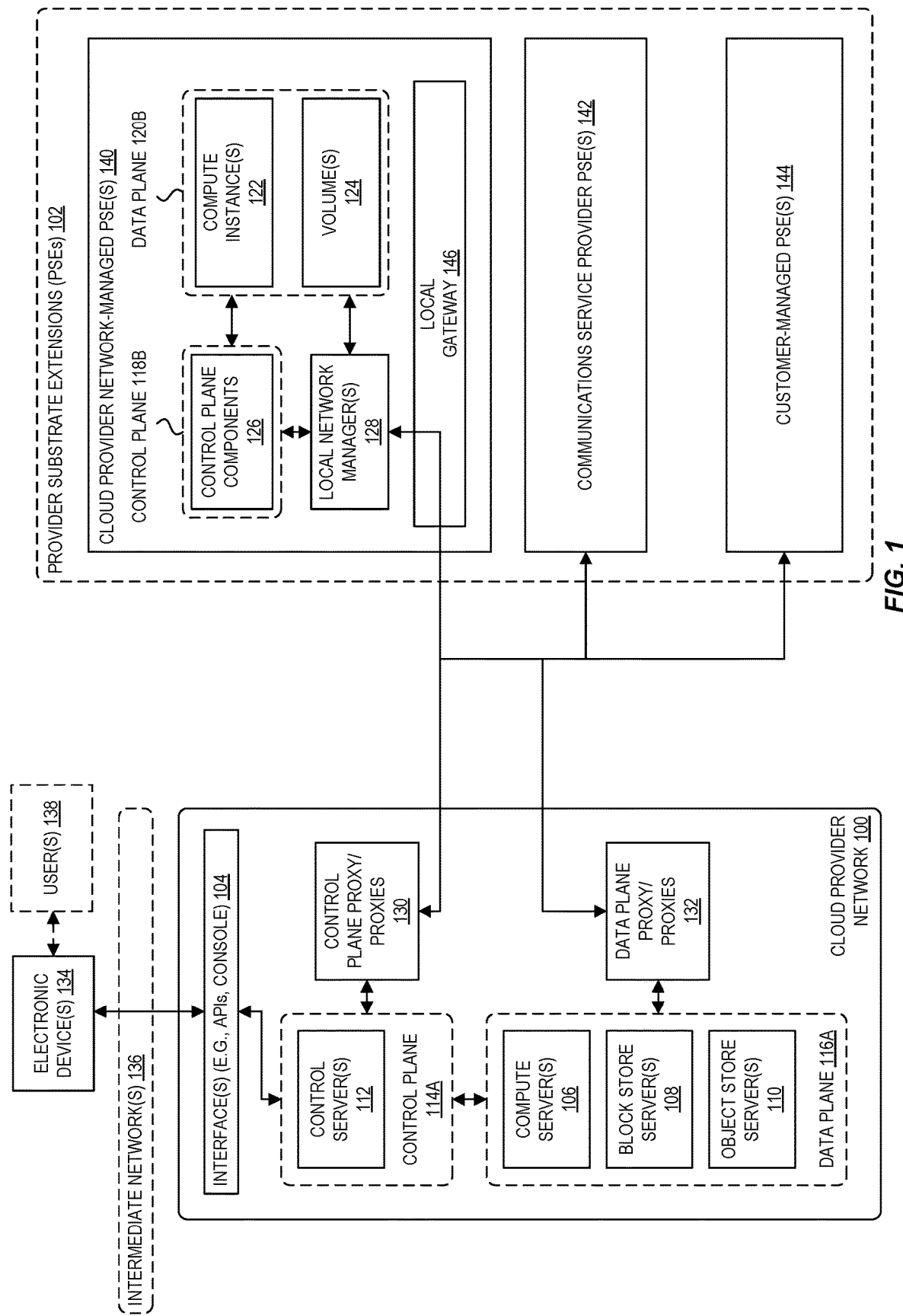
FIG. 1 illustrates an exemplary system including a cloud provider network and further including various provider substrate extensions of the cloud provider network according to some embodiments.

The present disclosure relates to methods, apparatus, systems, and non-transitory computer-readable storage media that enable a provider network to manage the deployment and execution of user workloads at provider substrate extensions using edge-optimized compute instances. According to embodiments described herein, a provider network enables users to create and configure "application profiles" that include parameters related to execution of user workloads at provider substrate extensions (e.g., including desired amounts of computing resources to be devoted to instances launched based on a profile, desired latency and geographic constraints for launched instances, instance placement and scaling configurations, etc.). Once an application profile is created, users can request the deployment of user workloads to provider substrate extensions by requesting instance launches based on a defined application profile. The service provider network can then automate the launch and placement of the user's workload at one or more provider substrate extensions using edge-optimized compute instances (e.g., compute instances tailored for execution within provider substrate extension environments). In some embodiments, once such edge-optimized instances are deployed, the service provider network can manage the auto-resizing of the instances in terms of various types of computing resources devoted to the instances, manage the lifecycle of instances to ensure maximum capacity availability at provider substrate extension locations, and perform other instance management processes. Among other benefits, the use of application profiles and edge-optimized instances enables users to readily launch workloads at provider substrate extensions in a manner that abstracts many of the details of a possibly diverse set of provider substrate extension locations (e.g., locations having varying hardware infrastructures, total capacities, cellular or other types of network topologies, etc.), and further enables cloud providers to better manage limited capacity at such locations and to satisfy customer workload performance expectations.

A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands. Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some embodiments, segments of a cloud provider network—referred to herein as a "provider substrate extension" (PSE) or "edge location" (EL)—can be provisioned within a network that is separate from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, in a separate cloud provider-managed facility, in a communications service provider facility, or in any other type of facility including servers where such server(s) communicate over a network (e.g., a publicly-accessible network such as the Internet) with a nearby availability zone or region of the cloud provider network. Customers may access a provider substrate extension via the cloud provider substrate or another network and may use the same application programming interfaces (APIs) to create and manage resources in the provider substrate extension as they would use to create and manage resources in the region of a cloud provider network.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a separate control plane of the cloud provider network.

In some embodiments, yet another example of a provider substrate extension is a network deployed within a communications service provider network. Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

As used herein, the computing resources of the cloud provider network installed within a communications service provider network (or possibly other networks) are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. A provider substrate extension deployed in a communication service provider network may also be referred to as a "wavelength zone."

FIG. 1 illustrates an exemplary system including a cloud provider network and further including various provider substrate extensions of the cloud provider network according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 138) can connect to virtualized computing devices and other cloud provider network 100 resources and services using various interfaces 104 (e.g., APIs) via intermediate network(s) 136. An API refers to an interface and/or communication protocol between a client (e.g., an electronic device 134) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 106, a block store server 108, an object store server 110, a control server 112) can have an IP address in the substrate network. Hardware virtualization technology can enable multiple operating systems to run concurrently on a host computer, for example as virtual machines (VMs) on a compute server 106. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various embodiments: control plane traffic carried over a logical control plane 114A and data plane operations carried over a logical data plane 116A. While the data plane 116A represents the movement of user data through the distributed computing system, the control plane 114A represents the movement of control signals through the distributed computing system. The control plane 114A generally includes one or more control plane components or services distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 116A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 116A can include one or more compute servers 106, which may be bare metal (e.g., single tenant) or may be virtualized by a hypervisor to run multiple VMs (sometimes referred to as "instances") or microVMs for one or more customers. These compute servers 106 can support a virtualized computing service (or "hardware virtualization service") of the cloud provider network. The virtualized computing service may be part of the control plane 114A, allowing customers to issue commands via an interface 104 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 116A can also include one or more block store servers 108, which can include persistent storage for storing volumes of customer data as well as software for managing these volumes. These block store servers 108 can support a managed block storage service of the cloud provider network. The managed block storage service may be part of the control plane 114A, allowing customers to issue commands via the interface 104 (e.g., an API) to create and manage volumes for their applications running on compute instances. The block store servers 108 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 116A can also include one or more object store servers 110, which represent another type of storage within the cloud provider network. The object store servers 110 include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 102 ("PSE") provides resources and services of the cloud provider network 100 within a separate network, thereby extending functionality of the cloud provider network 100 to new locations (e.g., for reasons related to latency in communications with customer devices, legal compliance, security, etc.). As indicated, such provider substrate extensions 102 can include cloud provider network-managed provider substrate extensions 140 (e.g., formed by servers located in a cloud provider-managed facility separate from those associated with the cloud provider network 100), communications service provider substrate extensions 142 (e.g., formed by servers associated with communications service provider facilities), customer-managed provider substrate extensions 144 (e.g., formed by servers located on-premise in a customer or partner facility), among other possible types of substrate extensions.

As illustrated in the example provider substrate extension 140, a provider substrate extension 102 can similarly include a logical separation between a control plane 118B and a data plane 120B, respectively extending the control plane 114A and data plane 116A of the cloud provider network 100. The provider substrate extension 102 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 102. As described above, the cloud provider network 100 may offer a set of predefined instance types, each having varying types and quantities of underlying hardware resources. Each instance type may also be offered in various sizes. In order to enable customers to continue using the same instance types and sizes in a provider substrate extension 102 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 100 and the cloud provider network provider substrate extension.

As illustrated, the provider substrate extension servers can host one or more compute instances 122. Compute instances 122 can be VMs, or containers that package up code and all its dependencies so an application can run quickly and reliably across computing environments (e.g., including VMs). In addition, the servers may host one or more data volumes 124, if desired by the customer. In the region of a cloud provider network 100, such volumes may be hosted on dedicated block store servers. However, due to the possibility of having a significantly smaller capacity at a provider substrate extension 102 than in the region, an optimal utilization experience may not be provided if the provider substrate extension includes such dedicated block store servers. Accordingly, a block storage service may be virtualized in the provider substrate extension 102, such that one of the VMs runs the block store software and stores the data of a volume 124. Similar to the operation of a block storage service in the region of a cloud provider network 100, the volumes 124 within a provider substrate extension 102 may be replicated for durability and availability. The volumes may be provisioned within their own isolated virtual network within the provider substrate extension 102. The compute instances 122 and any volumes 124 collectively make up a data plane extension 120B of the provider network data plane 116A within the provider substrate extension 102.

The servers within a provider substrate extension 102 may, in some implementations, host certain local control plane components 126, for example, components that enable the provider substrate extension 102 to continue functioning if there is a break in the connection back to the cloud provider network 100. Examples of these components include a migration manager that can move compute instances 122 between provider substrate extension servers if needed to maintain availability, and a key value data store that indicates where volume replicas are located. However, generally the control plane 118B functionality for a provider substrate extension will remain in the cloud provider network 100 in order to allow customers to use as much resource capacity of the provider substrate extension as possible.

Server software running at a provider substrate extension 102 may be designed by the cloud provider to run on the cloud provider substrate network, and this software may be enabled to run unmodified in a provider substrate extension 102 by using local network manager(s) 128 to create a private replica of the substrate network within the edge location (a "shadow substrate"). The local network manager(s) 128 can run on provider substrate extension 102 servers and bridge the shadow substrate with the provider substrate extension 102 network, for example, by acting as a virtual private network (VPN) endpoint or endpoints between the provider substrate extension 102 and the proxies 130, 132 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 128 allow resources in the provider substrate extension 102 to seamlessly communicate with resources in the cloud provider network 100. In some implementations, a single local network manager can perform these actions for all servers hosting compute instances 122 in a provider substrate extension 102. In other implementations, each of the server hosting compute instances 122 may have a dedicated local network manager. In multi-rack edge locations, inter-rack communications can go through the local network managers, with local network managers maintaining open tunnels to one another.

Provider substrate extension locations can utilize secure networking tunnels through the provider substrate extension 102 network to the cloud provider network 100, for example, to maintain security of customer data when traversing the provider substrate extension 102 network and any other intermediate network (which may include the public internet). Within the cloud provider network 100, these tunnels are composed of virtual infrastructure components including isolated virtual networks (e.g., in the overlay network), control plane proxies 130, data plane proxies 132, and substrate network interfaces. Such proxies may be implemented as containers running on compute instances. In some embodiments, each server in a provider substrate extension 102 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between a provider substrate extension 102 location and the cloud provider network 100 can be used for control and data plane communications. As compared to a VPN through other networks, the direct connection can provide constant bandwidth and more consistent network performance because of its relatively fixed and stable network path.

A control plane (CP) proxy 130 can be provisioned in the cloud provider network 100 to represent particular host(s) in an edge location. CP proxies are intermediaries between the control plane 114A in the cloud provider network 100 and control plane targets in the control plane 118B of provider substrate extension 102. That is, CP proxies 130 provide infrastructure for tunneling management API traffic destined for provider substrate extension servers out of the region substrate and to the provider substrate extension 102. For example, a virtualized computing service of the cloud provider network 100 can issue a command to a VMM of a server of a provider substrate extension 102 to launch a compute instance 122. A CP proxy maintains a tunnel (e.g., a VPN) to a local network manager 128 of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at a provider substrate extension 102 or may be able to manage control plane traffic for multiple servers in the same provider substrate extension.

A data plane (DP) proxy 132 can also be provisioned in the cloud provider network 100 to represent particular server(s) in a provider substrate extension 102. The DP proxy 132 acts as a shadow or anchor of the server(s) and can be used by services within the cloud provider network 100 to monitor health of the host (including its availability, used/free compute and capacity, used/free storage and capacity, and network bandwidth usage/availability). The DP proxy 132 also allows isolated virtual networks to span provider substrate extensions 102 and the cloud provider network 100 by acting as a proxy for server(s) in the cloud provider network 100. Each DP proxy 132 can be implemented as a packet-forwarding compute instance or container. As illustrated, each DP proxy 132 can maintain a VPN tunnel with a local network manager 128 that manages traffic to the server(s) that the DP proxy 132 represents. This tunnel can be used to send data plane traffic between the provider substrate extension server(s) and the cloud provider network 100. Data plane traffic flowing between a provider substrate extension 102 and the cloud provider network 100 can be passed through DP proxies 132 associated with that provider substrate extension. For data plane traffic flowing from a provider substrate extension 102 to the cloud provider network 100, DP proxies 132 can receive encapsulated data plane traffic, validate it for correctness, and allow it to enter into the cloud provider network 100. DP proxies 132 can forward encapsulated traffic from the cloud provider network 100 directly to a provider substrate extension 102.

Local network manager(s) 128 can provide secure network connectivity with the proxies 130, 132 established in the cloud provider network 100. After connectivity has been established between the local network manager(s) 128 and the proxies, customers may issue commands via the interface 104 to instantiate compute instances (and/or perform other operations using compute instances) using provider substrate extension resources in a manner analogous to the way in which such commands would be issued with respect to compute instances hosted within the cloud provider network 100. From the perspective of the customer, the customer can now seamlessly use local resources within a provider substrate extension (as well as resources located in the cloud provider network 100, if desired). The compute instances set up on a server at a provider substrate extension 102 may communicate both with electronic devices located in the same network as well as with other resources that are set up in the cloud provider network 100, as desired. A local gateway 146 can be implemented to provide network connectivity between a provider substrate extension 102 and a network associated with the extension (e.g., a communications service provider network in the example of a provider substrate extension 142).

There may be circumstances that necessitate the transfer of data between the object storage service and a provider substrate extension 102. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, a PSE 102 forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 2:
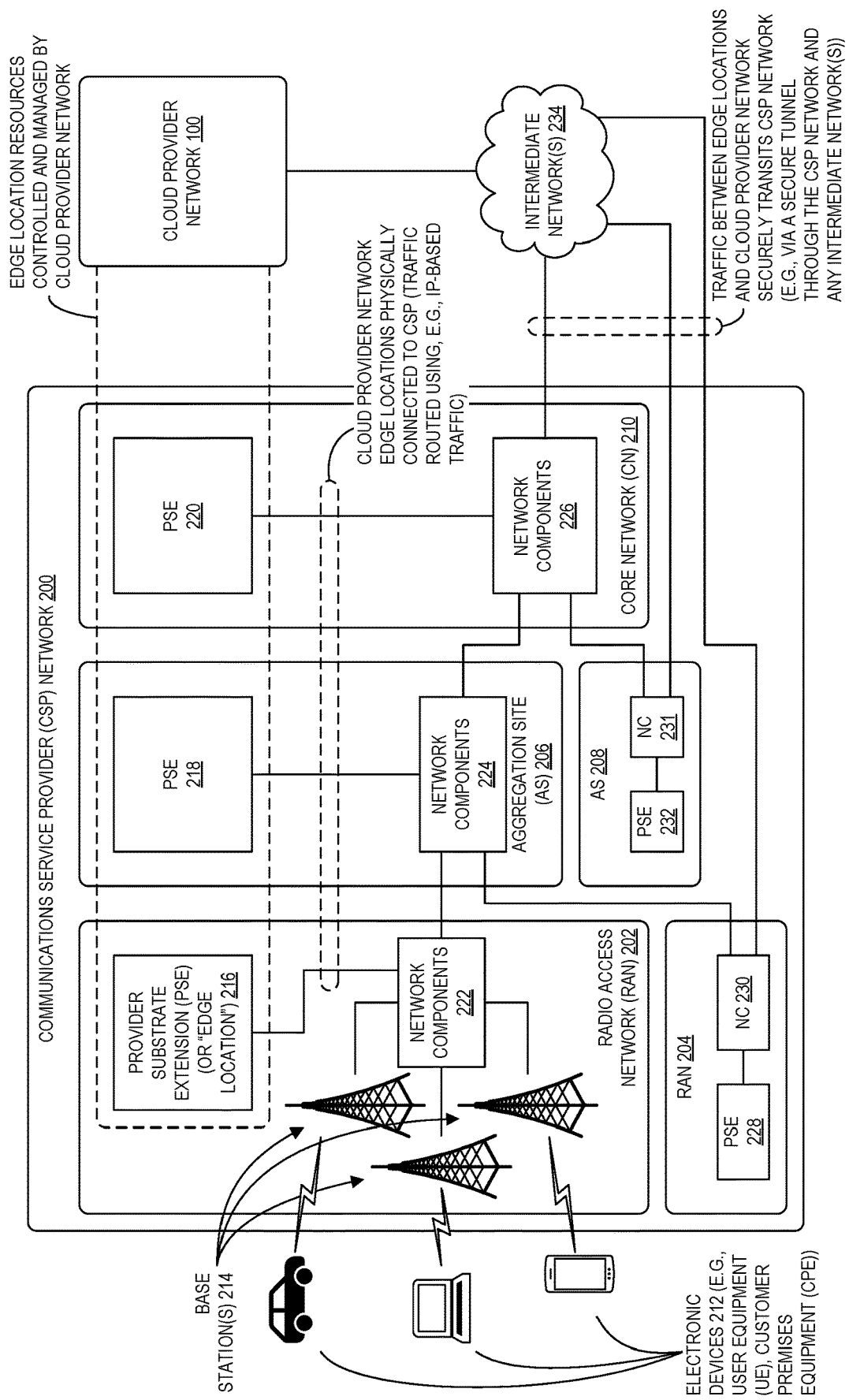
FIG. 2 illustrates an exemplary system in which cloud provider network substrate extensions are deployed within a communications service provider network according to some embodiments.

FIG. 2 illustrates an exemplary system in which cloud provider network edge locations are deployed within a communications service provider network according to some embodiments. A communications service provider (CSP) network 200 generally includes a downstream interface to end user electronic devices and an upstream interface to other networks (e.g., the internet). In this example, the CSP network 200 is a wireless "cellular" CSP network that includes radio access networks (RAN) 202, 204, aggregation sites (AS) 206, 208, and a core network (CN) 210. The RANs 202, 204 include base stations (e.g., NodeBs, eNodeBs, gNodeBs) that provide wireless connectivity to electronic devices 212. The core network 210 typically includes functionality related to the management of the CSP network (e.g., billing, mobility management, etc.) and transport functionality to relay traffic between the CSP network and other networks. Aggregation sites 206, 208 can serve to consolidate traffic from many different radio access networks to the core network and to direct traffic originating from the core network to the various radio access networks.

From left to right in FIG. 2, end user electronic devices 212 wirelessly connect to base stations (or radio base stations) 214 of a radio access network 202. Such electronic devices 212 are sometimes referred to as user equipment (UE) or customer premises equipment (CPE). Data traffic is often routed through a fiber transport network consisting of multiple hops of layer 3 routers (e.g., at aggregation sites) to the core network 210. The core network 210 is typically housed in one or more data centers. For data traffic destined for locations outside of the CSP network 200, the network components 222-226 typically include a firewall through which traffic can enter or leave the CSP network 200 to external networks such as the internet or a cloud provider network 100. Note that in some embodiments, the CSP network 200 can include facilities to permit traffic to enter or leave from sites further downstream from the core network 210 (e.g., at an aggregation site or RAN).

Provider substrate extensions 216-220 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, provider substrate extensions 216, 218, and 220 are in communication with a cloud provider network 100.

Typically, the further—e.g., in terms of network hops and/or distance—a provider substrate extension is from the cloud provider network 100 (or closer to electronic devices 212), the lower the network latency is between computing resources within the provider substrate extension and the electronic devices 212. However, physical site constraints often limit the amount of provider substrate extension location computing capacity that can be installed at various points within the CSP or determine whether computing capacity can be installed at various points at all. For example, a provider substrate extension sited within the core network 210 can typically have a much larger footprint (in terms of physical space, power requirements, cooling requirements, etc.) than a provider substrate extension sited within the RAN 202, 204.

The installation or siting of provider substrate extensions within a CSP network can vary subject to the particular network topology or architecture of the CSP network. As indicated in FIG. 2, provider substrate extensions can generally be connected anywhere the CSP network can break out packet-based traffic (e.g., IP based traffic). Additionally, communications between a given provider substrate extension and the cloud provider network 100 typically securely transit at least a portion of the CSP network 200 (e.g., via a secure tunnel, virtual private network, a direct connection, etc.). In the illustrated example, the network components 222 facilitate the routing of data traffic to and from a provider substrate extension 216 integrated with the RAN 202, the network components 224 facilitate the routing of data traffic to and from an provider substrate extension 218 integrated with the AS 206, and the network components 226 facilitate the routing of data traffic to and from a provider substrate extension 220 integrated with the CN 210. Network components 222-226 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between a provider substrate extension 228 and the cloud provider network 100 can be broken out of the CSP network 200 without routing through the core network 210. For example, network components 230 of a RAN 204 can be configured to route traffic between a provider substrate extension 216 of the RAN 204 and the cloud provider network 100 without traversing an aggregation site or core network 210. As another example, network components 231 of an aggregation site 208 can be configured to route traffic between a provider substrate extension 232 of the aggregation site 208 and the cloud provider network 100 without traversing the core network 210. The network components 230, 231 can include a gateway or router having route data to direct traffic from the edge location destined for the cloud provider network 100 to the cloud provider network 100 (e.g., through a direct connection or an intermediate network 234) and to direct traffic from the cloud provider network 100 destined for the provider substrate extension to the provider substrate extension.

In some embodiments, provider substrate extensions can be connected to more than one CSP network. For example, when two CSPs share or route traffic through a common point, a provider substrate extension can be connected to both CSP networks. For example, each CSP can assign some portion of its network address space to the provider substrate extension, and the provider substrate extension can include a router or gateway that can distinguish traffic exchanged with each of the CSP networks. For example, traffic destined for the provider substrate extension from one CSP network might have a different destination IP address, source IP address, and/or virtual local area network (VLAN) tag than traffic received from another CSP network. Traffic originating from the provider substrate extension to a destination on one of the CSP networks can be similarly encapsulated to have the appropriate VLAN tag, source IP address (e.g., from the pool allocated to the provider substrate extension from the destination CSP network address space) and destination IP address.

Note that while the exemplary CSP network architecture of FIG. 2 includes radio access networks, aggregation sites, and a core network, the architecture of a CSP network can vary in naming and structure across generations of wireless technology, between different CSPs, as well as between wireless and fixed-line CSP networks. Additionally, while FIG. 2 illustrates several locations where an edge location can be sited within a CSP network, other locations are possible (e.g., at a base station).

Figure 3:
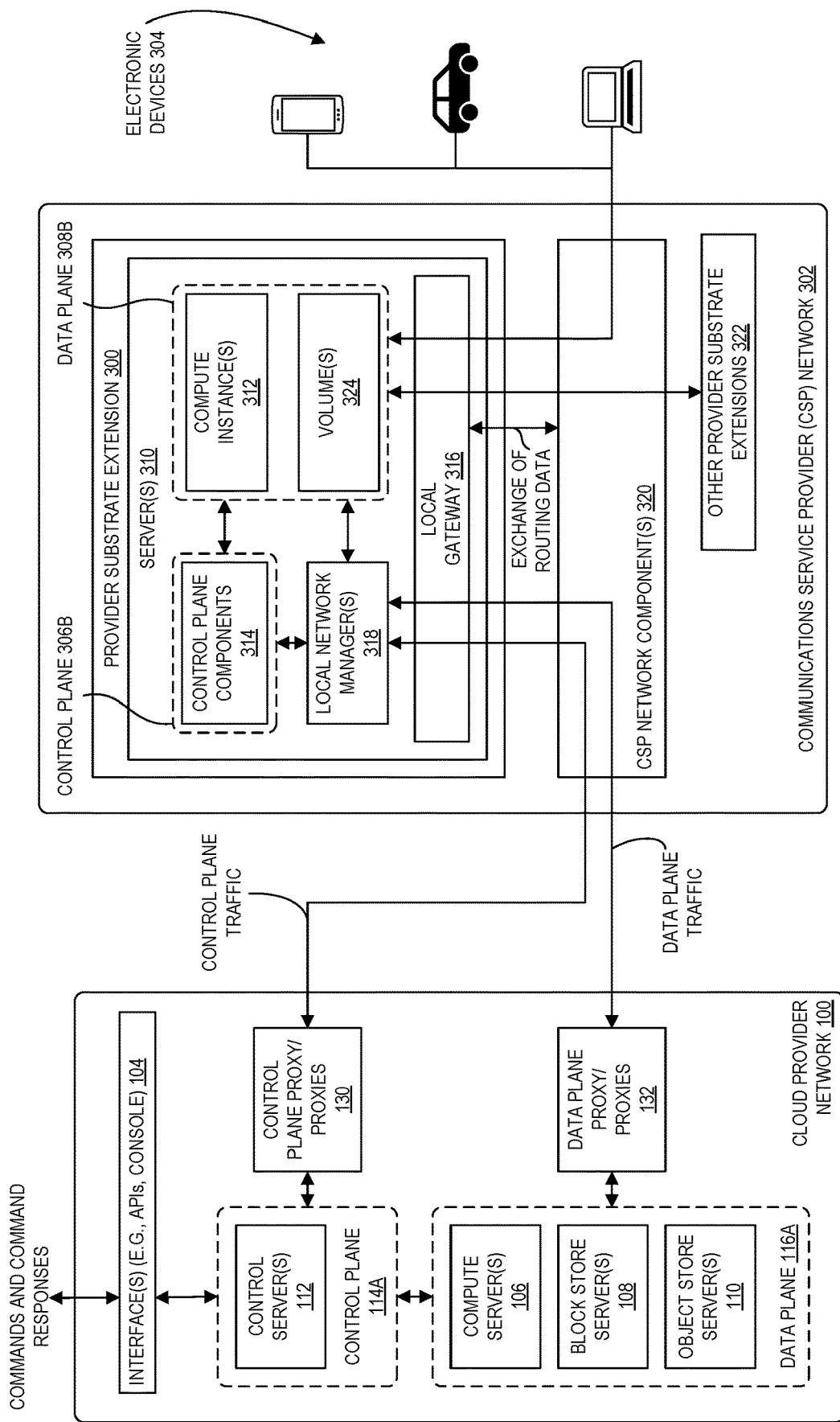
FIG. 3 illustrates in greater detail exemplary components of and connectivity between a cloud provider network and a provider substrate extension within a communications service provider network according to some embodiments.

FIG. 3 illustrates in greater detail exemplary components of and connectivity between a cloud provider network and a provider substrate extension within a communications service provider network according to some embodiments. A provider substrate extension 300 provides resources and services of the cloud provider network within a CSP network 302 thereby extending functionality of the cloud provider network 100 to be closer to end user devices 304 connected to the CSP network.

The provider substrate extension 300 similarly includes a logical separation between a control plane 306B and a data plane 308B, respectively extending the control plane 114A and data plane 116A of the cloud provider network 100. The provider substrate extension 300 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers 310 can be provisioned by the cloud provider for deployment within the CSP network 302.

The servers 310 within a provider substrate extension 300 may, in some implementations, host certain local control plane components 314, for example, components that enable the provider substrate extension 300 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 306B functionality for a provider substrate extension 300 will remain in the cloud provider network 100 in order to allow customers to use as much resource capacity of the provider substrate extension as possible.

As illustrated, the provider substrate extension servers 310 can host compute instances 312. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 310 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 310 may host one or more data volumes 324, if desired by the customer. The volumes may be provisioned within their own isolated virtual network within the provider substrate extension 300. The compute instances 312 and any volumes 324 collectively make up a data plane extension 308B of the provider network data plane 116A within the provider substrate extension 300.

A local gateway 316 can be implemented to provide network connectivity between the provider substrate extension 300 and the CSP network 302. The cloud provider can configure the local gateway 316 with an IP address on the CSP network 302 and to exchange routing data (e.g., via the Border Gateway Protocol (BGP)) with the CSP network components 320. The local gateway 316 can include one or more route tables that control the routing of inbound traffic to the provider substrate extension 300 and outbound traffic leaving the provider substrate extension 300. The local gateway 316 can also support multiple VLANs in cases where the CSP network 302 uses separate VLANs for different portions of the CSP network 302 (e.g., one VLAN tag for the wireless network and another VLAN tag for a fixed network).

In some embodiments of a provider substrate extension 300, the extension includes one or more switches, sometimes referred to top of rack (TOR) switches (e.g., in rack-based embodiments). The TOR switches are connected to CSP network routers (e.g., CSP network components 320), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 100 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 302 to facilitate the exchange of routing data.

Data plane traffic originating from the provider substrate extension 300 can have a number of different destinations. For example, traffic addressed to a destination in the data plane 116A of the cloud provider network 100 can be routed via the data plane connection between the provider substrate extension 300 and the cloud provider network 100. The local network manager 318 can receive a packet from a compute instance 312 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 312 addressed to another compute instance hosted in another provider substrate extension 322, the local network manager 318 can encapsulate the packet with a destination as the IP address assigned to the other provider substrate extension 322, thereby allowing the CSP network components 320 to handle the routing of the packet. Alternatively, if the CSP network components 320 do not support inter-edge location traffic, the local network manager 318 can address the packet to a relay in the cloud provider network 100 that can send the packet to the other provider substrate extension 322 via its data plane connection (not shown) to the cloud provider network 100. Similarly, for traffic from a compute instance 312 address to a location outside of the CSP network 302 or the cloud provider network 100 (e.g., on the internet), if the CSP network components 320 permit routing to the internet, the local network manager 318 can encapsulate the packet with a source IP address corresponding to the IP address in the carrier address space assigned to the compute instance 312. Otherwise, the local network manager 318 can send the packet to an Internet Gateway in the cloud provider network 100 that can provide internet connectivity for the compute instance 312. For traffic from a compute instance 312 addressed to an electronic device 304, the local gateway 316 can use Network Address Translation (NAT) to change the source IP address of the packet from an address in an address space of the cloud provider network to an address space of the carrier network.

The local gateway 316, local network manager(s) 318, and other local control plane components 314 may run on the same servers 310 that host compute instances 312, may run on a dedicated processor (e.g., on an offload card) integrated with edge location servers 310, or can be executed by servers separate from those that host customer resources.

Figure 4:
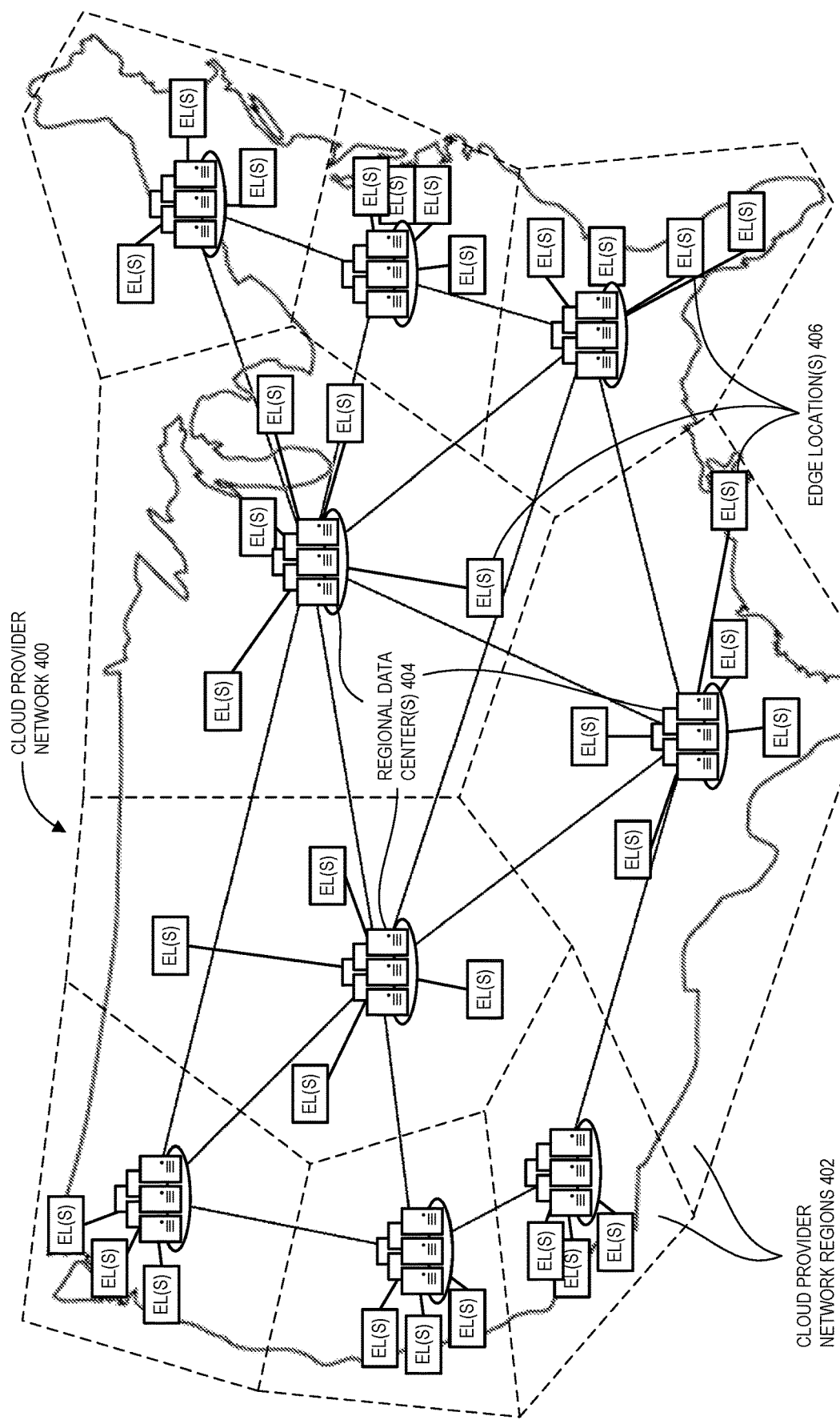
FIG. 4 illustrates an exemplary cloud provider network including geographically dispersed provider substrate extensions (or "edge locations") according to some embodiments.

FIG. 4 illustrates an exemplary cloud provider network including geographically dispersed provider substrate extensions (or "edge locations") according to some embodiments. As illustrated, a cloud provider network 400 can be formed as a number of regions 402, where a region is a separate geographical area in which the cloud provider has one or more data centers 404. Each region 402 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 406 can be much higher. Such widespread deployment of edge locations 406 can provide low-latency connectivity to the cloud for a much larger group of end user devices (in comparison to those that happen to be very close to a regional data center). In some embodiments, each edge location 406 can be peered to some portion of the cloud provider network 400 (e.g., a parent availability zone or regional data center). Such peering allows the various components operating in the cloud provider network 400 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 406 can be structured in several ways. In some implementations, an edge location 406 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers, instead of the edge location infrastructure described herein.

As indicated herein, a core service provided by many cloud service providers enables users to deploy and use general-purpose compute resources to execute user workloads. Existing general-purpose compute services, however, are largely designed with users in mind who desire to launch compute instances and allow those instances to run for an indefinite period of time. These use cases are typically facilitated by service provider infrastructures having many large data centers spread across many regions, each associated with ample capacity that can be easily scaled by the service provider as needed. The general-purpose compute services supported by these infrastructures often enable users to deploy and use many different types and sizes of compute instances, where such compute instances can be selected from a variety of defined instance types depending on the type of computing they plan to perform.

As indicated above, the introduction of provider substrate extensions has enabled customers of a cloud provider to deploy various types of computing resources, including general-purpose compute resources used to execute user workloads, at locations that extend a cloud provider network. As one example, and as illustrated in FIGS. 1-3, these provider substrate extensions can include substrate extensions installed near the edge of communication service provider (CSP) networks, at other types of nontraditional locations managed by the cloud provider (e.g., at locations installed near networks owned by airports, stock exchanges, or other entities), and at locations managed users of the cloud provider (e.g., within on-premises locations of cloud provider customers). At these and other provider substrate extension locations, end user computing devices can communicate with deployed resources with very low latency, in some cases single-digit millisecond latency. It is thus desirable for compute instances to launch as quickly as possible at such locations to avoid negating some of these low latency gains at the edge. For example, if end-user devices can access an instance running within a provider substrate extension with tens of milliseconds latency or less, but it takes seconds to launch an instance, some of those latency gains are immediately lost. Furthermore, because the total amount of available capacity at provider substrate extensions may often be significantly less than traditional data centers managed by a cloud provider, it is desirable to support edge-optimized instances that can be launched quickly, perform the computational task for which they were launched, and terminate as soon as possible so as to free capacity at the provider substrate extensions for other workloads.

Figure 5:
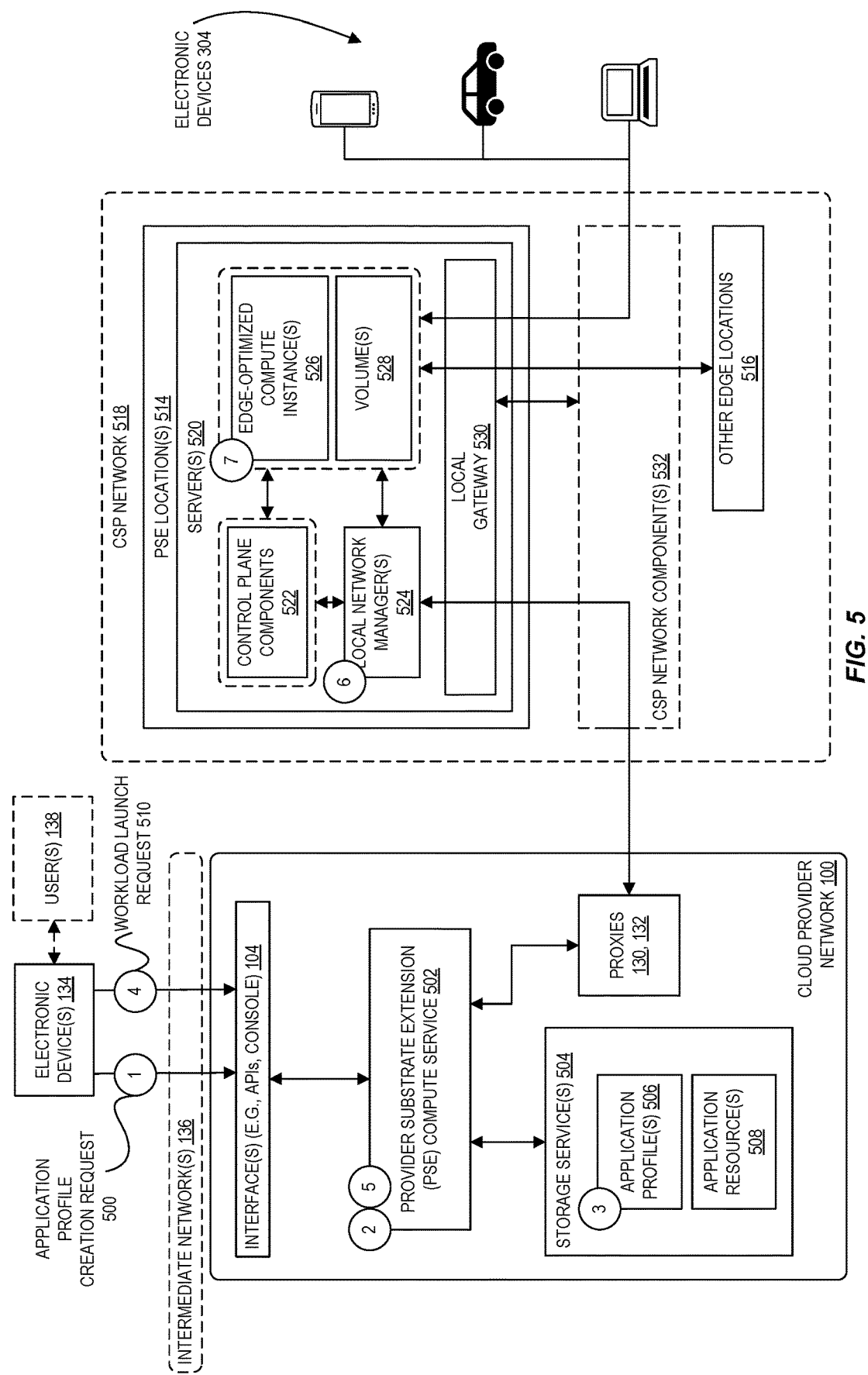
FIG. 5 is a diagram illustrating an environment in which edge-optimized compute instances are used to execute customer workloads at provider substrate extensions according to some embodiments.

According to embodiments herein, a provider network enables users to execute workloads at provider substrate extensions using edge-optimized instances. In some embodiments, users of the provider network utilize such edge-optimized instances via user-defined "application profiles." An application profile generally enables users to define a set of parameters related to how a user desires a user workload to execute at provider substrate extensions. The parameters can include, for example, computing resource-related configurations, a latency profile for execution of the workload at provider substrate extensions, geography-related configurations, placement configurations, and the like, as described in more detail herein. FIG. 5 is a diagram illustrating an environment in which edge-optimized compute instances are used to execute customer workloads at provider substrate extensions according to some embodiments. In FIG. 5, the numbered circles "1"-"7" illustrate a process that includes a user creating an application profile for a workload that the user desires to deploy at provider substrate extension locations (e.g., a provider substrate extension 514 within a CSP network 518), a user sending a request to launch one or more edge-optimized instances based on the defined application profile, and the cloud service provider causing one or more edge-optimized instances (e.g., edge-optimized compute instances 526) to be launched at one or more provider substrate extensions (e.g., provider substrate extension location 514) based on the relevant application profile.

At circle "1" in FIG. 5, in some embodiments, an application profile creation request 500 to create an application profile is sent from an electronic device 134 to the provider network 100. As indicated above, communications between electronic device(s) 134 and the provider network 100, such as a request to create an application profile, can be routed through interface(s) 104, such as through use of application programming interface (API) calls, via a console implemented as a website or application, and so forth. In addition to serving as a frontend to control plane services, the interface(s) 104 can perform operations such as verifying the identity and permissions of the user initiating a request, evaluating the request and routing it to the appropriate control plane services, and the like. In some embodiments, at circle "2," a PSE compute service 502 processes the request 500 and, at circle "3," stores a resulting application profile in association with a user account generating the request (e.g., as part of application profiles 506 stored at a storage service 504 or other storage location). In some embodiments, the PSE compute service 502 generally enables users to manage the deployment of user workloads to provider substrate extensions 102 and, in some implementations, may be part of a more general hardware virtualization service of the provider network 100.

Figure 6:
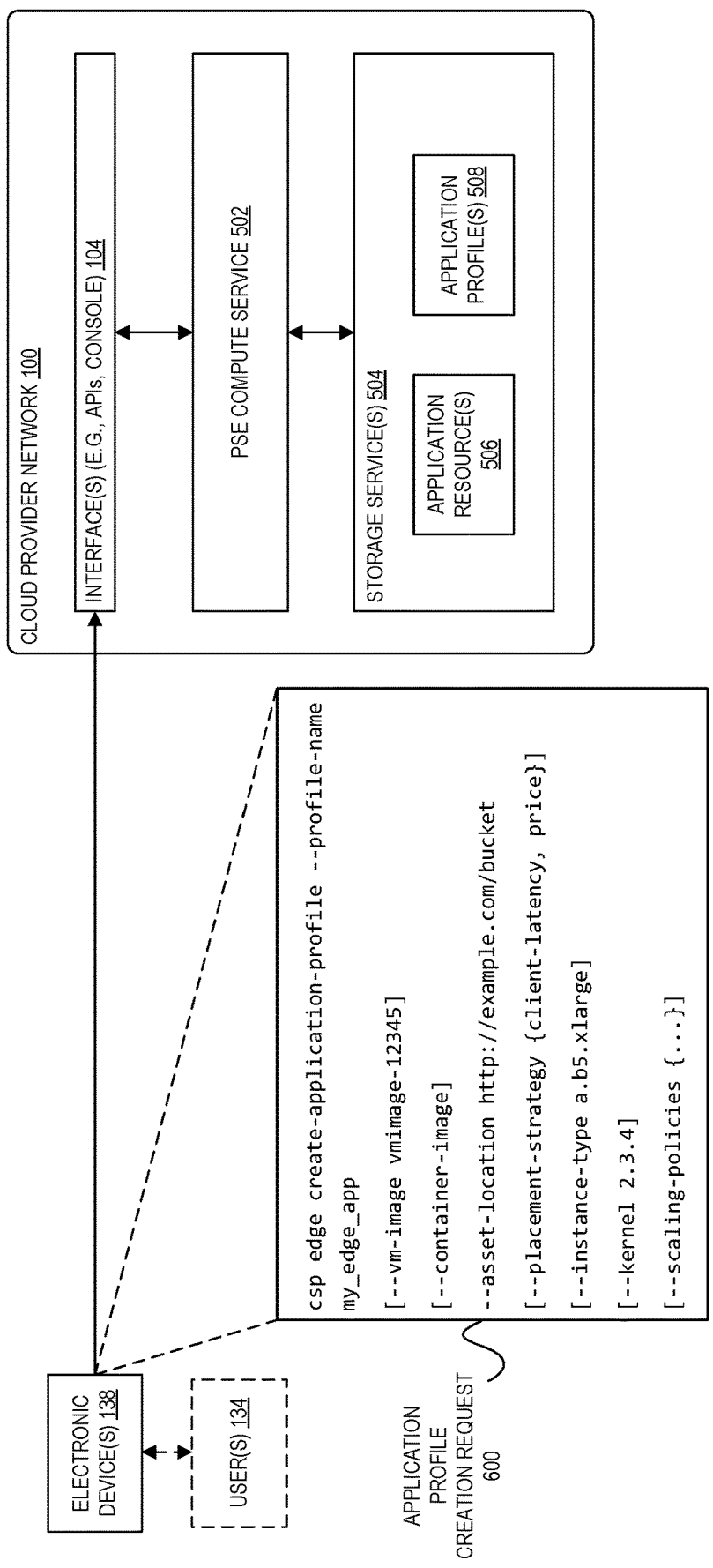
FIG. 6 is a diagram illustrating an exemplary request used to create an application profile used execute customer workloads at provider substrate extensions according to some embodiments.

FIG. 6 is a diagram illustrating an exemplary request used to create an application profile used execute customer workloads at provider substrate extensions according to some embodiments. The application profile creation request 600, for example, illustrates an example format for a request to create a new application profile via a PSE compute service 502. Whereas users may ordinarily request the launch of compute instances at a provider network by specifying a particular type of compute instance (e.g., a compute instance type associated with a specific combination of CPU, memory, storage, and networking capacity), an application profile instead enables users to specify a profile of the application or workload that the user desires to have execute upon compute instances to be launched at one or more provider substrate extensions. This profile of a user's workload can then be used by the provider network 100, upon subsequent requests by a user, to launch one or more edge-optimized compute instances in a manner that satisfies the parameters defined by the user in the profile. In this manner, users can focus on defining how they desire for their applications and workloads to operate and perform rather than having to separately consider the particulars of underlying compute instances to be used to execute those workloads (e.g., separately considering particular variants of compute instance to launch, directly managing placement and grouping of those instances, etc.). Furthermore, this abstraction of the underlying compute instances to be used to execute user workloads enables a provider network with additional flexibility in how the instances used to support the workloads are provided and managed.

As shown in FIG. 6, a user has generated an application profile creation request 600 using an electronic device 134. As illustrated, an application profile request 600 can include an action name indicating that creation of a new application profile is desired (e.g., "csp edge create-application-profile"), a parameter value indicating a "user-friendly" name for the application profile (e.g., "--profile name my_edge-_app"), and a number of other optional parameters related to execution of an identified workload at provider substrate extensions of a provider network.

In some embodiments, one parameter value that can be included in an application profile creation request 600 is a value identifying a resource to be used as a template to launch compute instances based on the application profile. For example, if a user has created a VM image, a virtual appliance, a container image, or any other type of resource that can be used to launch compute instances (such as, for example, VMs, microVMs, containers, etc., stored as application resource(s) 508), a user can provide an identifier of the resource (e.g., an identifier of the resource known to the cloud provider network 100). In some embodiments, a user can provide an identifier of a storage location storing a resource that can be used to launch compute instances (e.g., a URL or other identifier of a storage location within the cloud provider network 100 or elsewhere storing the resource).

In some embodiments, another example parameter that can be specified in an application profile creation request 600 includes parameters related to computing resources to be devoted to instances launched based on the profile. For example, users can specify resource constraints in terms of CPU, memory, networking performance, or any other resource related parameters (e.g., a user might specify that instances to be launched based on an application profile are allocated two vCPUs, 8 GiB of memory, up to 10 Gbps of networking, or any other combination of resources), such that instances launched based on the application profile are provided with the requested resources (assuming the requested resources are available at any provider substrate extension locations satisfying other application profile constraints). In some embodiments, users may specify resource constraints in terms of defined instance types (e.g., instance types associated with defined amounts of CPU, memory, networking, etc., resources as defined by the cloud provider network 100). Other resource-related parameters can include block device mappings to be used by launched instances, kernel versions, and the like.

In some embodiments, other example parameters include parameters relate to other aspects of placing edge-optimized instances at provider substrate extensions. For example, one communication service provider-related parameter that can specified includes an identification of particular communication service providers (e.g., to indicate that a user desires for instances to be launched at provider substrate extensions associated with communication service provider A or communication service provider B, but not at provider substrate extensions associated with communication service provider C). Yet another example communication service provider-related parameter that can be specified includes one or more particular geographic locations at which it is desired for edge-optimized instances to be launched (e.g., at provider substrate extensions near downtown Austin, at provider substrate extensions near the San Francisco Bay Area, at provider substrate extensions in a southwest region or northeast region, etc.). Yet another example parameter includes a latency profile for execution of the user's workload at provider substrate extensions, where a latency profile generally indicates desired latency for edge-optimized instances relative to end users or between other network points (e.g., at PSEs having 20 millisecond latency or less to end users, at PSEs near Los Angeles having 30 milliseconds or less to end users, etc.).

In some embodiments, yet other example parameters that can be specified in an application profile creation request 600 include various networking configurations. For example, to enable for communication between an in-region application running in a private network and an application running in a provider substrate extension, an application profile configuration may be specified so that a private network endpoint is provided to the in-region private network to make calls out to the edge-optimized instance. To enable bidirectional communication, customers can also provide a private network endpoint to their provider substrate extension application which can be used to communicate from the provider substrate extensions to the region.

In some embodiments, yet other example parameters that may be specified in an application profile creation request 600 include scaling policies to be used once one more instances have been launched based on the application profile. For example, users can specify scale-in and scale-out policies in an application profile for their applications, where such policies enable adjusting capacity in and across provider substrate extension locations. In some embodiments, when scaling in, new capacity defaults to being launched in the same location that is under load and expands to other locations as long as they fulfill the client latency constraints, if there are any. If no client latency constraints are specified, for example, new capacity may be added in the same location that is under load and expand to other locations until a monitored metric is below the scaling threshold.

As indicated above, in some embodiments, an application profile creation request 600 is received by a PSE compute service 502 at a cloud provider network 100. Once received, the PSE service 502 processes the requests, including validating the specified parameters and other aspects of the request, and stores a data object representing the application profile with other application profiles 506 at a storage service 504 of the cloud provider network 100 or other storage location.

In some embodiments, in response to receiving an application profile creation request 600 identifying a storage location of a resource to be used to launch edge-optimized instances based on the profile, the PSE service 502 sends a copy of the resource to provider substrate extension locations at which it appears likely that edge-optimized instances will be launched in the future. For example, based on the parameters specified in the corresponding application profile, the PSE compute service 502 may identify one or more PSEs satisfying any capacity, latency, geographic, and other constraints specified in the application profile. Once identified, the PSE compute service 502 can send a copy of the resource for storage at the provider substrate extension, thereby enabling the provider substrate extensions to more readily launch compute instances based on the resources once requested. In other examples, a PSE compute service 502 may send a copy of such resources at the time a request is received to launch one or more instances, as described herein.

In some instances, customers may over time update the assets and/or configuration associated with a previously defined application profile. For example, in some embodiments, users can generate an application profile update request to a PSE compute service 502 to identify a location of updated resources from which edge-optimized instances are to be launched or to update other configurations associated with the application profile. In other embodiments, a PSE compute service 502 may automatically identify an update to one or more resources identified by an existing application profile. To accommodate such updates, and to allow customers to manage how such updates are propagated to provider substrate extensions at which edge-optimized instances are currently launched, in some embodiments, the edge compute service 502 allows customers to create separate versions of an application profile. For example, each change to an application profile or an associated resource may cause the generation of a new application profile version associated with a unique identifier. Customers can use this identifier to reference specific versions of their application in different parts of the API associated with the PSE compute service 502 (for example, so that a user can specify the launch of edge-optimized compute instances based on a specific version of an application profile or perform other such operations).

As indicated above, once an application profile has been defined by a user, users can launch edge-optimized compute instances by identifying the associated application profile and optionally requesting launch of a specified number of instances. For example, at circle "4" in FIG. 5, a user might cause the generation of a workload launch request 510 to run N number of instances of an identified application profile, where N may correspond to a number of edge-optimized instances to be launched satisfying the constraints of the application profile. Similar to the application profile creation request 500 described above, communications between electronic device(s) 134 and the provider network 100, such as a request to launch one or more instances based on an application profile, can be routed through interface(s) 104, such as through use of application programming interface (API) calls, via a console implemented as a website or application, and so forth. In addition to serving as a frontend to control plane services, the interface(s) 104 can perform operations such as verifying the identity and permissions of the user initiating a request, evaluating the request and routing it to the appropriate control plane services, and the like.

In some embodiments, at circle "5," such launch requests are received by a PSE compute service 502, which may include several components (e.g., a placement manager, network manager, and storage manager, etc.) that are used to collectively identify one or more provider substrate extension locations (e.g., from among provider substrate extension 514 and other edge locations 516) at which edge-optimized instances can be launched to satisfy the parameters in the identified application profile. The number of identified provider substrate extension locations may depend on a large number of constraints specified in the identified application profile as indicated above. Once identified, at circle "6," the PSE compute service 502 sends instructions to the PSE location requesting the launch of the instances (and associated resources such as volume(s) 528 or other resources) (e.g., via a local gateway 530 and local network manager 524, possibly also via CSP network component(s) 532). In some embodiments, at circle "7," the requested edge-optimized instances can then be launched at one or more servers 520 within the provider substrate extension, as described in more detail below.

Figure 7:
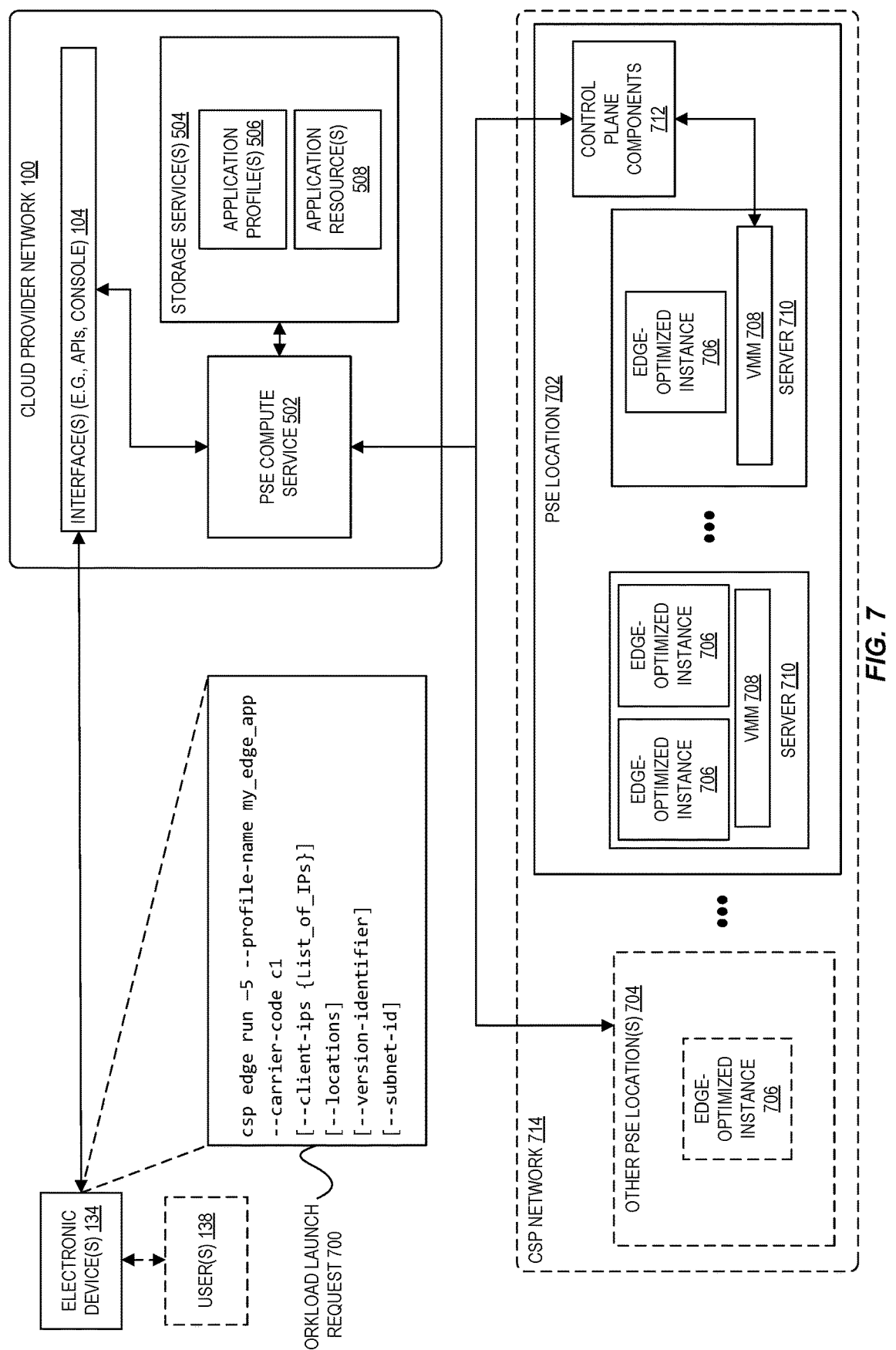
FIG. 7 is a diagram illustrating an exemplary request used to launch edge-optimized compute instances at provider substrate extensions based on a defined application profile according to some embodiments.

FIG. 7 illustrates greater detail related to launching edge-optimized instances responsive to a launch request according to some embodiments. As shown in FIG. 7, a workload launch request 700 is generated at an electronic device 134. In other examples, a workload launch request 700 may generated by another application or service, in response to triggering of an autoscaling policy, or in response to other events. As illustrated, a workload launch request 700 can include an action name indicating a desires to launch N edge-optimized compute instances based on an identified application profile (e.g., "csp edge run-5—profile-name my_edge_app") as well as values related to various parameters such as, for example, an identifier of one or more communication service providers at which to the launch instances, IP addresses to assign to instances, geographic locations in which to launch the instances, an identifier of an application profile version to use, an identifier of a subnet in which to launch the instances, among other possible parameters.

In some embodiments, a PSE compute service 502 uses the customer-specified parameters in an application profile, in addition to any relevant parameters specified in the request, to determine one or more provider substrate extensions at which to launch instances based on a launch request 700. As one example, for latency-related criteria specified in an application profile, the PSE compute service 502 can evaluate the criteria against latency data stored in a data store (e.g., a database). Generally, the latency data may include or permit the derivation of latencies between points within a CSP network 714 and possibly between points within the CSP network 714 and points in the cloud provider network 100. The latency data may further include geographic data about the locations of various entry points to the CSP network 714 (e.g., coverage areas of base stations or other equipment through which electronic devices access the CSP network 714).

Upon receipt of a request for suitable provider substrate extension locations that satisfy criteria specified in an application profile, the PSE compute service 502 can access the latency data to identify which provider substrate extension locations satisfy those requirements. For the illustrated example, assume a customer has specified a latency requirement for end user devices within region to a requested compute instance. The PSE compute service 502 can use the latency data to identify that a PSE location 702 is associated with the region (e.g., because it includes a particular base station covering the region). The PSE compute service 502 can then use information to determine which PSE locations satisfy the customer latency requirement. Here, the edge PSE compute service 502 might determine that PSE location 702 (and possibly other PSE location 704) satisfy the latency requirements.

In addition to identifying provider substrate extensions that satisfy a specified latency profile, a PSE location placement service can further narrow the suitable provider substrate extension locations based on other application profile parameters (e.g., provider substrate extension locations associated with one or more particular communications service provider, provider substrate extension locations having sufficient capacity available according the specified resource requirements, etc.). Based on the identification of provider substrate extension location(s), the PSE compute service 502 can either return an error to the customer if the request could not be satisfied or proceed with the launch of compute instance(s) based on the identified application profile. The request may fail, for example, if no provider substrate extension locations satisfy the customer's application profile requirements or if the customer has requested N compute instances spread across N provider substrate extension locations but less than N provider substrate extension locations satisfy the customer's application profile requirements. Assuming the customer's request could be satisfied, the PSE compute service 502 can issue control plane command(s) to the provider substrate extension location(s) to launch the requested instance(s) (e.g., to control plane components 712).

In some embodiments, the PSE compute service 502 performs several steps to launch and configure the instance(s) regardless of how the PSE location on which to launch an instance(s) is identified. In some embodiments, the PSE compute service 502 can create or extend an isolated virtual network associated with the customer at a provider substrate extension location. An isolated virtual network can be considered a virtual network that operates on top of the provider network substrate (or substrate extension) through which customer traffic (e.g., data plane traffic) originates or terminates. The PSE compute service 502 can then issue a command to a VMM 708 on the PSE location 702 physical server (e.g., one or more of physical servers 710) to launch a compute instance having a virtual network interface to the isolated virtual network (e.g., having a cloud provider network IP address in the private IP address range assigned to the isolated virtual network). Additionally, the PSE compute service 502 can associate a second, carrier IP address to the compute instance from the group of IP addresses allocated to the edge location by the CSP. That association may include creating a NAT table entry on the local gateway of the PSE location to replace the source IP address of traffic from the edge location to end user electronic devices with the assigned carrier IP address and similarly to route traffic from end user electronic devices to the assigned carrier IP address to the first, cloud provider network IP address in the private IP address range assigned to the isolated virtual network.

In some cases, the number of identified suitable provider substrate extension locations may exceed the number of edge-optimized compute instances requested by the customer based on the application profile. In such cases, the PSE compute service 502 can proceed with additional selection criteria to select which of the suitable edge locations will be used to host the customer's requested edge-optimized compute instances. One such selection criteria is the available capacity on the suitable provider substrate extension locations. One way of measuring available capacity is tracking the number of previously launched edge-optimized instances per provider substrate extension location or per provider substrate extension location server. The PSE compute service 502 can track (e.g., in a database) which provider substrate extension locations have previously been used to launch edge-optimized compute instances and the resource consumption of those edge-optimized instances. Another way of measuring available capacity is based on the resource utilization of a provider substrate extension location or a provider substrate extension location's servers. An agent or other process executing locally on a provider substrate extension location or provider substrate extension location server can monitor utilization of processors, memory, network adapters, and storage devices used to host edge-optimized instances and report that utilization data to the PSE compute service 502. The PSE compute service 502 can select provider substrate extension locations with the highest amount of capacity (or lowest utilization) from the identified suitable PSE location(s).

Various approaches to obtaining latency data are possible, including those described below. To facilitate a robust set of customer latency requirements, the PSE compute service 502 can use one or more of the approaches described herein or others to determine latency between, for example, end user electronic devices and base stations, base stations and provider substrate extension locations, base stations and cloud provider network regions or availability zone data centers, provider substrate extension locations and other provider substrate extension locations, and provider substrate extension locations to cloud provider network regions or availability zone data centers. Latency typically refers to either the one-way time between one device sending a message to a recipient and the recipient receiving the message or to the round-trip time between one device issuing a request and subsequently receiving a response to that request. In some embodiments, latency data provides or allows for the derivation of latencies between various points for use in placement determinations by the PSE compute service 502.

Under a first approach, a CSP network 714 (or other type of provider substrate extension location) can include a latency service. The latency service can periodically receive or otherwise monitor delays throughout the CSP network 714. The latency service can include an API to which the PSE compute service 502 can issue calls to fetch latency data. Such an approach may be referred to as a query-based approach. An exemplary API of the latency service receives one or more routes—e.g., specified via endpoints within the CSP network 714—and returns the latency for the route(s). Provided an identification of various endpoints in the CSP network (e.g., by IP address), the PSE compute service 502 can build a view of the point-to-point latencies through the CSP network using the latency service. For example, based on knowledge of the various entry points (e.g., base stations) to a CSP network and their geographic locations, the PSE compute service 502 can build a latency data set from each entry point to each edge location. And based on the knowledge of the various edge locations integrated with the CSP network, the PSE compute service 502 can also measure the latency between the cloud provider network 100 and each of the provider substrate extension locations. The PSE compute service 502 can store or cache responses from the latency service and other latency measurements as latency data in the data store.

Under a second approach, the CSP can provide detailed information of the CSP network 714 topology from which the PSE compute service 502 can make or derive information to make placement determinations. The detailed information may be provided in an offline manner (e.g., a file transfer from the CSP to the cloud provider). Such an approach may be referred to as a model-based approach. The network topology information may be provided in or converted to a graph or other suitable data structure that represents things like the number of network hops and distance between network nodes (e.g., between base stations and edge locations, amongst edge locations, and between edge locations and the cloud provider network—the latter possibly augmented by the cloud provider with network topology information related to the connectivity between the CSP network and the cloud provider network). Additionally, the network topology information can include information related to the geographic location of entry points for end user devices to the network (e.g., base station coverage). Using a set of heuristics, the network topology information can be used to model the various latencies through the CSP network (e.g., point-to-point latencies). For example, the heuristics may include an estimated delay for signals between network nodes at a given distance (e.g., using the speed of light), modeled latencies added by various hops through the network (e.g., due to processing delays at routers or other networking equipment), etc. Because the network topology may change over time, the CSP can periodically provide updated information characterizing the CSP network topology. The PSE compute service 502 can store the modeled latencies as latency data in the data store.

Under a third approach, the CSP and/or the cloud provider can set up a network of "publisher" nodes that collect latency data and report it to the PSE compute service 502. Such publisher nodes can collect latency data in a number of ways, such as by pinging other devices, subscribing to events emitted by CSP network components, or polling CSP network APIs periodically to collect QoS data. Though similar to the query-based approach in that it provides a more up to date view of network latency than the model-based approach, the third-approach, referred to as a monitor-based approach, can be implemented without coordination with the CSP (whether through obtaining access to internal networking APIs such as a latency service, requiring the CSP to deploy latency monitoring facilities that might not exist, or by relying on the CSP for network topology data). For example, edge locations and/or end user electronic devices can include an application that monitors latencies to other devices. At the PSE location, the application may be executed by a compute instance or as a control plane component. At the end user electronic device, the application may be a background process incorporated as part of a SDK used to deploy applications to the end user devices. In either case, the application can periodically fetch an identification of other PSE locations and/or electronic devices (e.g., via IP address) from a service of the cloud provider network 100, measure the latency to the identified devices (e.g., via a ping request), and report the results to the edge location placement service. In the end user device case, the application can further report latency data between the end user device and its entry point into the CSP network (e.g., a base station). The PSE compute service 502 can store the reported data as latency data in the data store.

A number of different architectures can be used to support the execution of edge-optimized compute instances at provider substrate extension locations (e.g., such as edge-optimized instances 706). In some embodiments, the execution of edge-optimized compute instances is supported by a lightweight virtual machine manager (VMM) (e.g., VMM 708) running on the servers 710 upon which edge-optimized compute instances are launched based on application profiles. These VMMs 708 enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM.

A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

The use of such VMMs further enables full flexibility over the amount of resources devoted to each edge-optimized compute instance and enables the ability to dynamically resize an amount of resources devoted to instances during execution. This enables users to specify any resource specifications in application profiles, as described above, and the servers at which the edge-optimized instances are launched can accommodate the flexible resource specifications. In other embodiments, the execution of edge-optimized compute instances is based on the creation and execution of unikernels or other streamlined instance types based on VMs, containers, or other application formats. A unikernel, for example, can be encapsulated in a machine image with an application and the most minimal kernel, device drivers, and libraries, required to run the application. In general, such implementations enable edge-optimized compute instances 706 to be launched quickly and with minimal overhead.

As indicated above, in some embodiments, the resources allocated to edge-optimized compute instances can be dynamically resized over time in response to user requests or other conditions (e.g., changes in load experienced by particular instances). For example, if a user launches an edge-optimized instance based on an application profile that initially requests one vCPU, a VMM upon which the instance is launched may initially restrict the edge-optimized instance to use of CPU cycles equal to one vCPU (e.g., using the "cgroups" feature of some Linux kernels, or other similar mechanisms). In some embodiments, while an edge-optimized instance is running, a user can subsequently request that the same instance be allocated one or more additional vCPUs (e.g., such that the instance is allocated CPU cycles equal to two CPUs instead of only one). In this example, responsive to the request, a PSE compute service 502 can send instructions to the corresponding VMM 708 that cause the VMM to allocate a sufficient number of CPU cycles to the instance (assuming such resources are available within a tolerable oversubscription threshold on the server). Similarly, users can dynamically resize an amount of resources devoted to an edge-optimized instance in terms of memory, networking resources, or other resource dimensions. In some embodiments, the dynamic resizing of edge-optimized instances can also be performed to carry out autoscaling policies that a user has defined (e.g., to auto-resize instances based on varying load experienced by the instances), to manage available capacity at provider substrate extensions, or in response to other conditions.

As indicated above, in some embodiments, the placement and execution of edge-optimized instances onto servers at provider substrate extension servers can include oversubscribing the total amount of resources available at servers by a specified amount (e.g., instances placed on servers can be collectively provided with a number of vCPUs or other resource that exceeds an actual number or amount of underlying physical resources by some threshold percentage). In some embodiments, the oversubscription of resources can be managed using a token-based model where, for example, usage of CPU cycles or other resources can be associated with tokens that are incrementally provided to instances and depleted by the instances when used, thereby providing a throttling mechanism on resource usage by individual instances. The ability to oversubscribe resources on servers and provider substrate extensions generally enables the cloud provider network 100 with additional flexibility when placing edge-optimized instances onto a limited number of servers at provider substrate extension locations.

In some embodiments, the execution of edge-optimized compute instances includes a focus on maximizing resource utilization of the servers upon which the instances are placed. In particular, a cloud provider network 100 may seek to prevent edge-optimized compute instances from occupying space on servers at provider substrate extension locations without satisfying a defined threshold of resource utilization. For example, because only a limited number of instances can be present on provider substrate extension servers at any given time, and because the total number of servers available at provider substrate extension locations is typically limited, such "idle" instances may undesirably prevent other, more productive edge-optimized instances from making use of those limited resources. Thus, in some embodiments, the management of edge-optimized instances includes the monitoring and analyzing actual utilization by each of the edge-optimized instances running at edge locations and, in some instances, removing underutilized instances to free capacity for other more productive instances.

In some embodiments, the execution of edge-optimized compute instances may be strictly time-limited. For example, a cloud provider may limit the execution of edge-optimized instances to a maximum period of time (e.g., up to 6 hours, or up to any other defined time period) before a forced restart of the instances is performed. In this example, when an edge-optimized instance reaches the end of its lifecycle, the PSE compute service 502 may attempt to restart the edge-optimized instance and restore the previous its previous configuration (e.g., including IP address, storage volume, and other configurations). However, if sufficient capacity is unavailable to fulfill the requirements of the edge-optimized instance according to its associated application profile, the execution of the edge-optimized instances may be queued for fulfillment when the capacity becomes available.

In some embodiments, as indicated above, the removal of edge-optimized instances from provider substrate extension servers is based on monitoring metrics related to actual utilization of resources by the instances. For example, the cgroups feature described above or other tools may be used to measure over time the resource utilization of instances placed on a server and to send such data to a PSE compute service 502. In this example, if the PSE compute service 502 determines that a server includes some number of instances that do not satisfy a defined utilization threshold, and there are other instances pending placement at the PSE location, the PSE compute service 502 may send instructions to the PSE location to terminate the underutilized instance(s). In other embodiments, the PSE compute service 502 may generate a notification to a user or service associated with the instances indicating that the instances will be terminated at some point in the future if the resource utilization threshold is not met. Once such underutilized instances are terminated, other instances can be placed on the corresponding server. In other examples, the PSE compute service 502 may instead decide to leave the underutilized instances on the server and oversubscribe the resources on the server to other instances.

Figure 8:
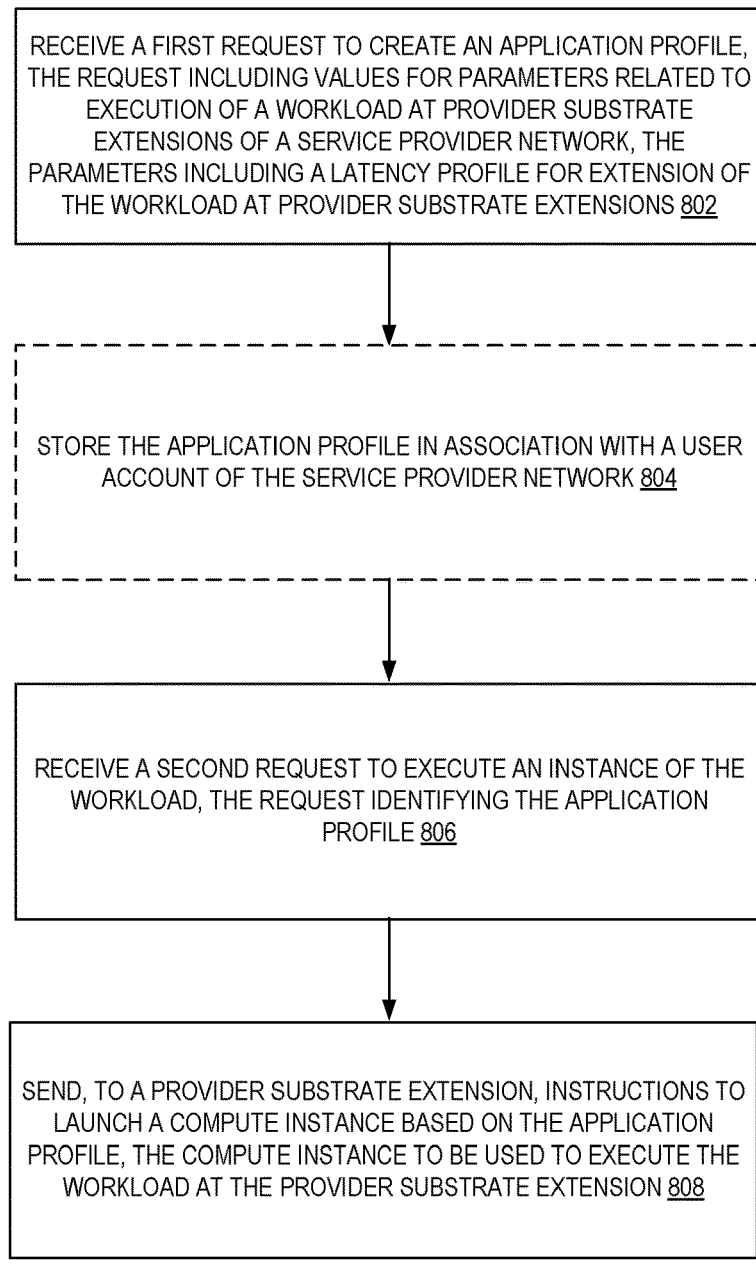
FIG. 8 is a flow diagram illustrating operations of a method for enabling users to define application profiles used to execute customer workloads at provider substrate extensions, and to launch edge-optimized compute instances at provider substrate extensions based on a defined application profile, according to some embodiments.

FIG. 8 is a flow diagram illustrating operations 800 of a method for enabling users to define application profiles used to execute customer workloads at provider substrate extensions, and to launch edge-optimized compute instances at provider substrate extensions based on a defined application profile, according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by a PSE compute service 502 of the other figures.

The operations 800 include, at block 802, receiving a first request to create an application profile, the request including values for parameters related to execution of a workload at provider substrate extensions of a service provider network. In some embodiments, the parameters related to execution of the workload at provider substrate extensions of the service provider network include at least one of: a set of geographic areas within which to launch compute instances, a set of communications service providers at which to launch compute instances, a latency threshold, and wherein the method further comprises identifying a set of candidate provider substrate extensions satisfying the values for the parameters specified in the application profile.

In some embodiments, the parameters related to execution of the workload at provider substrate extensions of the service provider network include at least one of: a number of virtual central processing units (vCPUs), an amount of memory, a type of storage, or a networking performance level, and wherein the method further comprises identifying a set of candidate provider substrate extensions having a server capable of hosting a compute instance satisfying the values for the parameters specified in the application profile.

In some embodiments, the parameters related to execution of the workload at provider substrate extensions of the service provider network include at least one of: a placement strategy for compute instances launched based on the application profile, or a scaling policy for compute instances launched based on the application profile.

In some embodiments, the application profile identifies a storage location of a resource to be used to launch compute instances based on the application profile, and the operations further include: obtaining the resource from the storage location; identifying, based on the application profile, a candidate provider substrate extension at which compute instances are to be launched; and sending the resource to the candidate provider substrate extension for storage at the candidate substrate extension.

The operations 800 further include, at block 804, storing the application profile in association with a user account of the service provider network.

The operations 800 further include, at block 806, receiving a second request to execute an instance of the workload, the request identifying the application profile.

In some embodiments, the operations further include identifying a set of candidate provider substrate extensions having at least one server upon which a compute instance can be launched satisfying the application profile, the set of provider substrate extensions including the provider substrate extension, wherein the provider substrate extension: includes a plurality of servers that provide capacity for execution of customer compute instances, and is controlled at least in part by a control plane of the service provider network.

The operations 800 further include, at block 808, sending, to a provider substrate extension, instructions to launch a compute instance based on the application profile, the compute instance to be used to execute the workload at the provider substrate extension. In some embodiments, the compute instance is a microVM running on a virtual machine manager (VMM) hosted by a server of the provider substrate extension.

In some embodiments, the operations further include obtaining metric data indicating utilization of computing resources by the compute instance; determining, based on the metric data, that utilization of the computing resources by the compute instance fails to satisfy a utilization threshold; and terminating the compute instance.

In some embodiments, the operations further include obtaining metric data indicating utilization of computing resources by the compute instance; determining, based on the metric data, to increase an amount of computing resources allocated to the compute instance by a server hosting the compute instance at the provider substrate extension; and causing the server hosting the compute instance to increase the amount of computing resources allocated to the compute instance during runtime of the compute instance.

In some embodiments, the compute instance is launched on a server having less physical resources than the combined amount of virtual resources allocated to compute instances on the server, and wherein a difference between the amount of physical resources and virtual resources is within an oversubscription threshold.

In some embodiments, the provider substrate extension includes one of: a network formed by servers located in a facility managed by a customer of the provider network, a network formed by servers located in a facility associated with a communications service provider, a network formed by servers located in a facility managed by a cloud provider and controlled at least in part by a separate control plane of the service provider network.

Figure 9:
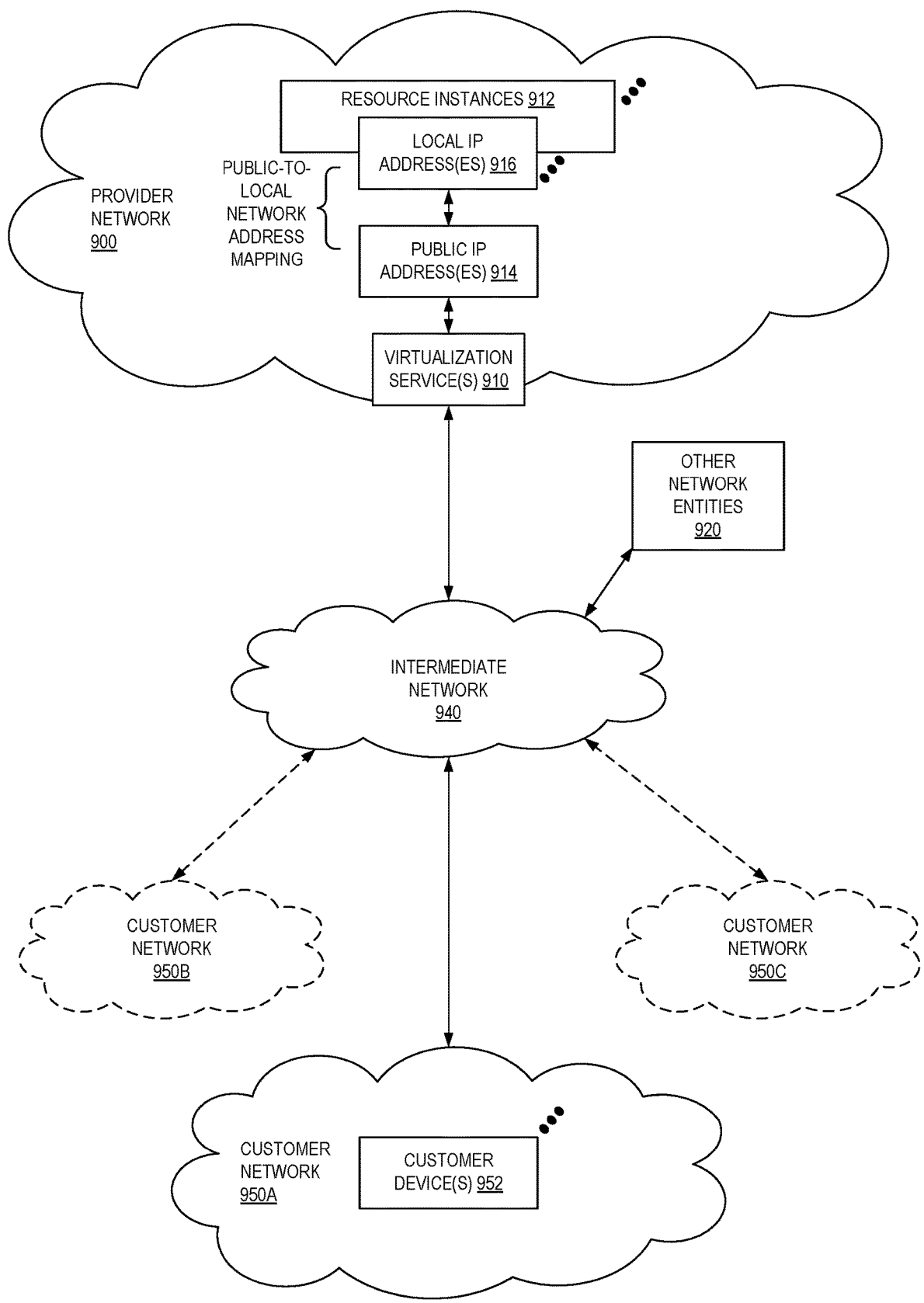
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
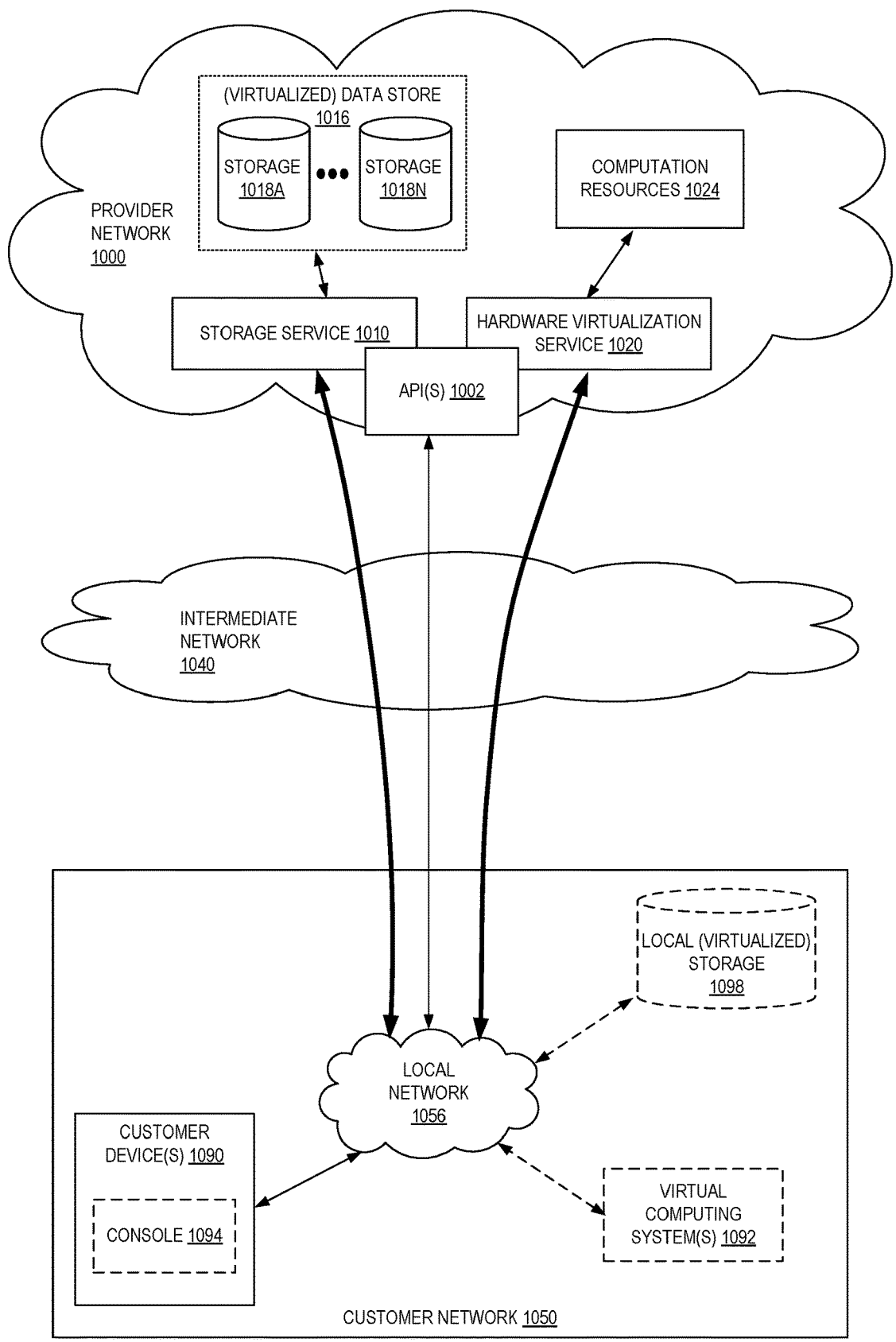
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
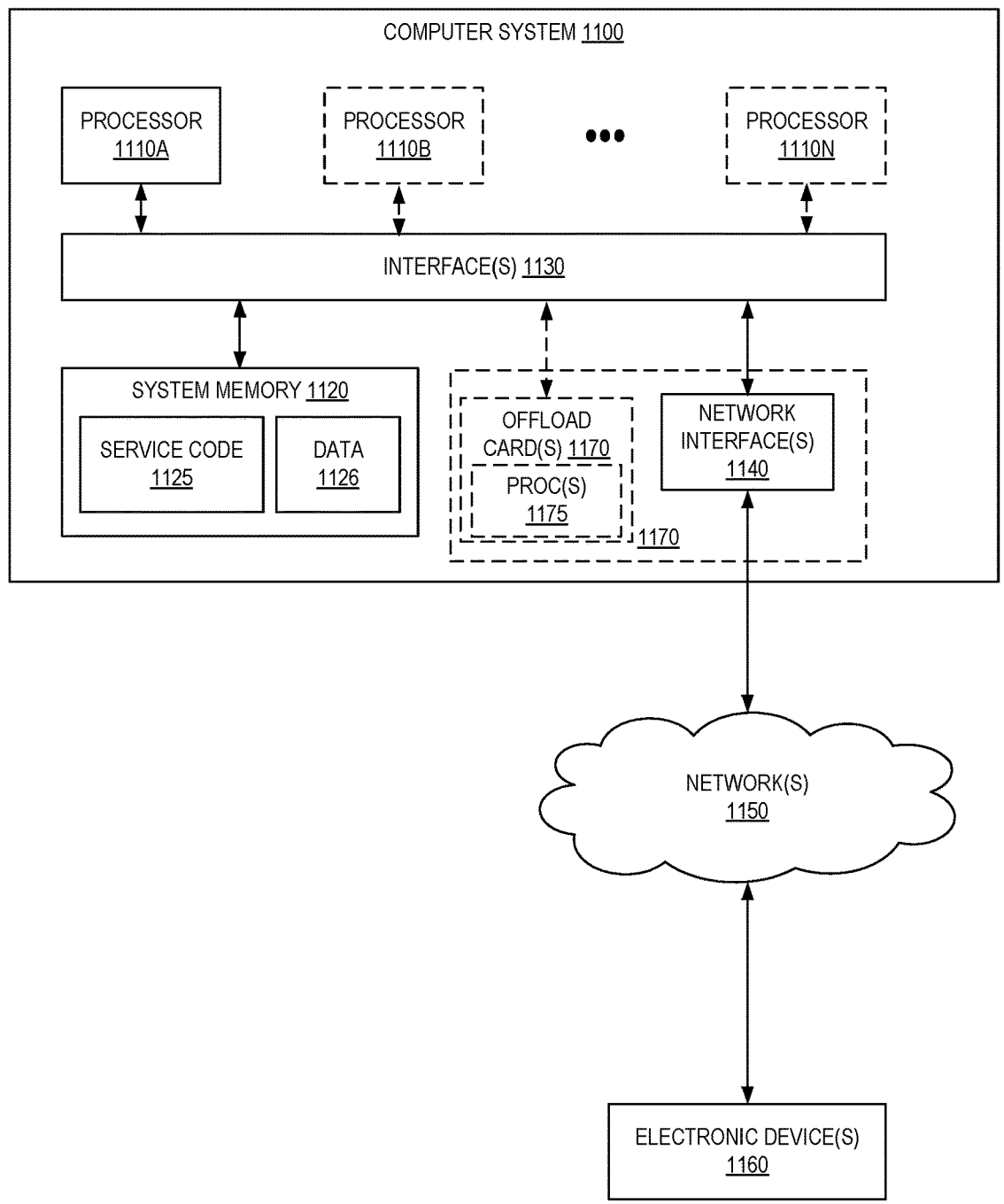
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as service code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to launch a workload at an extension of a region of a service provider network, wherein the extension of the region of the service provider network:
      includes computing infrastructure deployed at an edge location of a telecommunication carriers' network, and
      is controlled at least in part by a control plane in the region of the service provider network; and
   sending, to the extension of the region of the service provider network, instructions to launch a compute instance to be used to execute the workload.

2. The computer-implemented method of claim 1, wherein the compute instance launched in the extension of the region of the service provider network is a microVM running on a virtual machine manager (VMM) hosted by a server of the computing infrastructure.

3. The computer-implemented method of claim 1, wherein the request is a first request, and wherein the method further comprises receiving a second request to create an application profile including values for parameters related to execution of the workload, and wherein the parameters related to execution of the workload include at least one of: a storage location of a resource to be used to launch compute instances to execute the workload, a set of geographic areas within which to launch compute instances to execute the workload, a set of telecommunication carriers at which to launch compute instances to execute the workload, a latency threshold, a placement strategy for compute instances launched based on the application profile, a type of compute instance to be used to execute the workload, a kernel version, a number of virtual central processing units (vCPUs), an amount of memory, a type of storage, a networking performance level, or scaling policies to use to scale execution of the workload.

4. The computer-implemented method of claim 1, further comprising:
   obtaining metric data indicating utilization of computing resources by the compute instance at the extension of the region of the service provider network;
   determining, based on the metric data, that utilization of the computing resources by the compute instance fails to satisfy a utilization threshold; and
   terminating the compute instance.

5. The computer-implemented method of claim 1, wherein the workload relates to at least one of: gaming or game streaming, media streaming, connected automobiles, virtual reality, or industrial automation.

6. A computer-implemented method comprising:
   receiving a request to deploy an application at an extension of a service provider network, wherein the extension of the service provider network includes computing infrastructure that is deployed in a mobile operator's datacenter and is controlled at least in part by a control plane of the service provider network; and
   sending, to the extension of the service provider network, instructions to launch a compute instance to be used to execute the application.

7. The computer-implemented method of claim 6, wherein the application relates to at least one of: gaming or game streaming, media streaming, connected automobiles, virtual reality, or industrial automation.

8. The computer-implemented method of claim 6, the method further comprising:
   obtaining metric data indicating utilization of computing resources by the compute instance at the extension of the service provider network;
   determining, based on the metric data, that utilization of the computing resources by the compute instance fails to satisfy a utilization threshold; and
   terminating the compute instance.

9. The computer-implemented method of claim 6, further comprising:
   obtaining metric data indicating utilization of computing resources by the compute instance at the extension of the service provider network;
   determining, based on the metric data, to increase an amount of computing resources allocated to the compute instance by a server hosting the compute instance at the extension of the service provider network; and causing the server hosting the compute instance to increase the amount of computing resources allocated to the compute instance during runtime of the compute instance.

10. The computer-implemented method of claim 6, the method further comprising selecting the extension of the service provider network from a plurality of candidate extensions of the service provider network having at least one server upon which a compute instance can be launched.

11. The computer-implemented method of claim 6, wherein the compute instance is a microVM running on a virtual machine manager (VMM) hosted by a server at the extension of the service provider network.

12. The computer-implemented method of claim 6, wherein the request further includes values for parameters related to deploying the application, and wherein the parameters include at least one of: a set of geographic areas within which to deploy the application, a set of mobile operators with which to deploy the application, a latency threshold, and wherein the method further comprises selecting the extension of the service provider network from a plurality of candidate service provider networks based on the values for the parameters.

13. The computer-implemented method of claim 6, wherein the request further includes values for parameters related to deploying the application, and wherein the parameters related to deploying the application include at least one of: a number of virtual central processing units (vCPUs), an amount of memory, a type of storage, or a networking performance level, and wherein the method further comprises selecting the extension of the service provider network from a plurality of candidate service provider networks based on the values for the parameters.

14. The computer-implemented method of claim 6, wherein the request further includes values for parameters related to deploying the application, and wherein the parameters include at least one of: a placement strategy for compute instances used to deploy the application, or a scaling policy for compute instances used to deploy the application.

15. The computer-implemented method of claim 6, wherein the compute instance is launched on a server having fewer physical resources than a combined amount of virtual resources allocated to compute instances on the server, and wherein a difference between the amount of physical resources and virtual resources is within an oversubscription threshold.

16. The computer-implemented method of claim 6, wherein the request identifies a storage location of a resource to be used to launch the compute instance, and wherein the method further comprises:
   obtaining the resource from the storage location; and
   sending the resource to the extension of the service provider network for storage at the extension of the service provider network.

17. A system comprising:
   a compute service implemented by a first one or more electronic devices located at an extension of a service provider network, the compute service including instructions that upon execution cause the compute service to:
      receive a request to deploy an application at an extension of a service provider network, and
      send, to the extension of the service provider network, instructions to launch a compute instance to be used to execute the application; and
   the extension of the service provider network implemented by a second one or more electronic devices, wherein the extension of the service provider network includes computing infrastructure that is deployed in a mobile operator's datacenter and is controlled at least in part by a control plane of the service provider network, and wherein the extension of the service provider network includes instructions that upon execution cause the extension of the service provider network to:
      receive the instructions to launch the compute instance, and
      launch the compute instance at a computer system within the extension of the service provider network.

18. The system of claim 17, wherein the application relates to at least one of: gaming or game streaming, media streaming, connected automobiles, virtual reality, or industrial automation.

19. The system of claim 17, wherein the extension of the service provider network includes further instructions that upon execution cause the extension of the service provider network to:
   obtain metric data indicating utilization of computing resources by the compute instance at the extension of the service provider network;
   determine, based on the metric data, that utilization of the computing resources by the compute instance fails to satisfy a utilization threshold; and
   terminate the compute instance.

20. The system of claim 17, wherein the extension of the service provider network includes further instructions that upon execution cause the extension of the service provider network to:
   obtaining metric data indicating utilization of computing resources by the compute instance at the extension of the service provider network;
   determining, based on the metric data, to increase an amount of computing resources allocated to the compute instance by a server hosting the compute instance at the extension of the service provider network; and
   causing the server hosting the compute instance to increase the amount of computing resources allocated to the compute instance during runtime of the compute instance.

\* \* \* \* \*